_(12)_ United States Patent
Dudar

(10) Patent No.: US 10,145,340 B1
(45) Date of Patent: Dec. 4, 2018

(54) SYSTEMS AND METHODS FOR HEATING A VEHICLE INTAKE MANIFOLD DURING STOP/START EVENTS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/828,844

(22) Filed: Dec. 1, 2017

(51) Int. Cl.
| | |
|---|---|
| *B60T 7/12* | (2006.01) |
| *F02M 35/10* | (2006.01) |
| *F02N 11/08* | (2006.01) |
| *F02D 41/00* | (2006.01) |
| *F02M 26/19* | (2016.01) |
| *F02N 19/00* | (2010.01) |

(52) U.S. Cl.
CPC ... *F02M 35/10222* (2013.01); *F02D 41/0002* (2013.01); *F02M 26/19* (2016.02); *F02M 35/10268* (2013.01); *F02N 11/0814* (2013.01); *F02N 19/005* (2013.01); *F01N 2900/08* (2013.01); *F02D 2200/021* (2013.01)

(58) Field of Classification Search
CPC .............. F02D 41/0047; F02D 41/005; F02D 41/0057; F02D 41/0072; F02D 2021/083; F02D 2041/0067; F02M 31/02; F02M 31/04; F02M 31/13
USPC .............. 701/101, 108, 114, 115; 123/179.1, 123/179.4, 549, 556
See application file for complete search history.

(56) References Cited

U.S. PATENT DOCUMENTS

| | | | |
|---|---|---|---|
| 1,670,550 | A | 5/1928 | Putnam |
| 4,122,679 | A | 10/1978 | Charon |
| 4,404,931 | A | 9/1983 | Smith et al. |
| 5,655,506 | A | 8/1997 | Hollis |
| 6,851,404 | B2 | 2/2005 | Kojima |
| 6,964,269 | B2 | 11/2005 | Gschwind et al. |
| 9,669,825 | B1 | 6/2017 | Dudar |
| 2011/0120789 | A1 | 5/2011 | Teraya |
| 2013/0181836 | A1 | 7/2013 | Cardoso et al. |

(Continued)

FOREIGN PATENT DOCUMENTS

CN    103714363 A    4/2014

OTHER PUBLICATIONS

"Power Stroke Tech: Air Intake Heater," Diesel Tech Website, Available Online at www.dieseltechmag.com/2009/07/power-stroke-tech-air-intake, Jul. 2009, 1 page.

(Continued)

*Primary Examiner* — John Kwon
(74) *Attorney, Agent, or Firm* — Julia Voutyras; McCoy Russell LLP

(57) ABSTRACT

Methods and systems are provided for improving combustion events during cold-starts of a vehicle engine, where the cold-start events include start/stop events. In one example, a method comprises spinning the engine in a reverse direction in response to an engine pull-down event where a temperature of an intake manifold of the engine is below a threshold, to heat the intake manifold by drawing exhaust system heat to the intake manifold. In this way, combustion may be improved in response to requests to start the engine, which may reduce undesired emissions and which may improve fuel economy.

20 Claims, 6 Drawing Sheets

(56) References Cited

U.S. PATENT DOCUMENTS

2017/0145933 A1\* 5/2017 Dudar .................. B60K 6/24
2017/0363055 A1\* 12/2017 Dudar .................. G01M 3/025
2018/0171898 A1\* 6/2018 Ulrey .................... F02M 26/04

OTHER PUBLICATIONS

Bennink, C., "Diesel Engines: Get to Know Exhaust Colors," For Construction Pros Website, Available Online at http://www.forconstructionpros.com/equipment/fleet-maintenance/diesel-engines/article10286202/diesel-engines-get-to-know-your-colors, Mar. 23, 2011, 2 pages.

\* cited by examiner

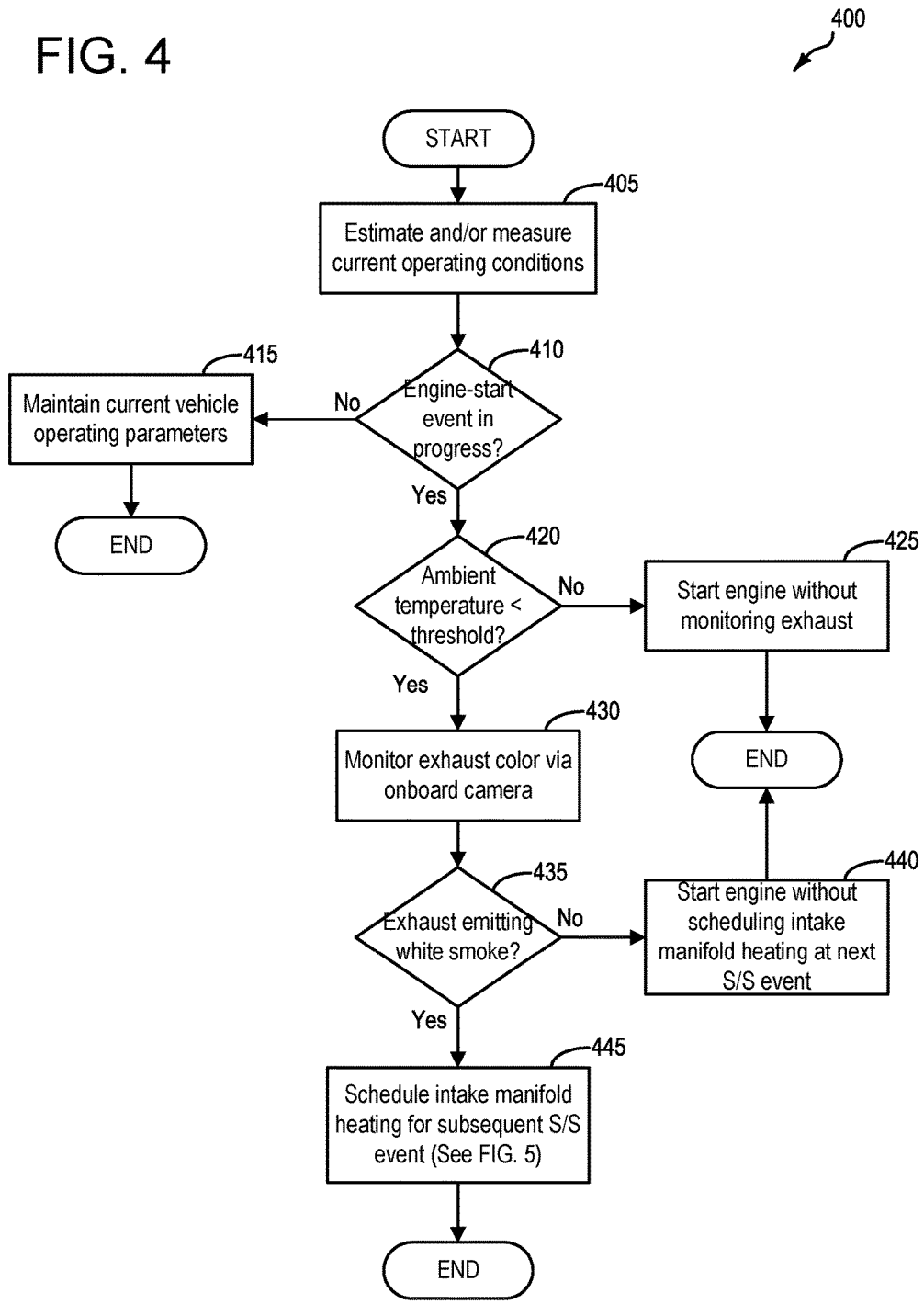

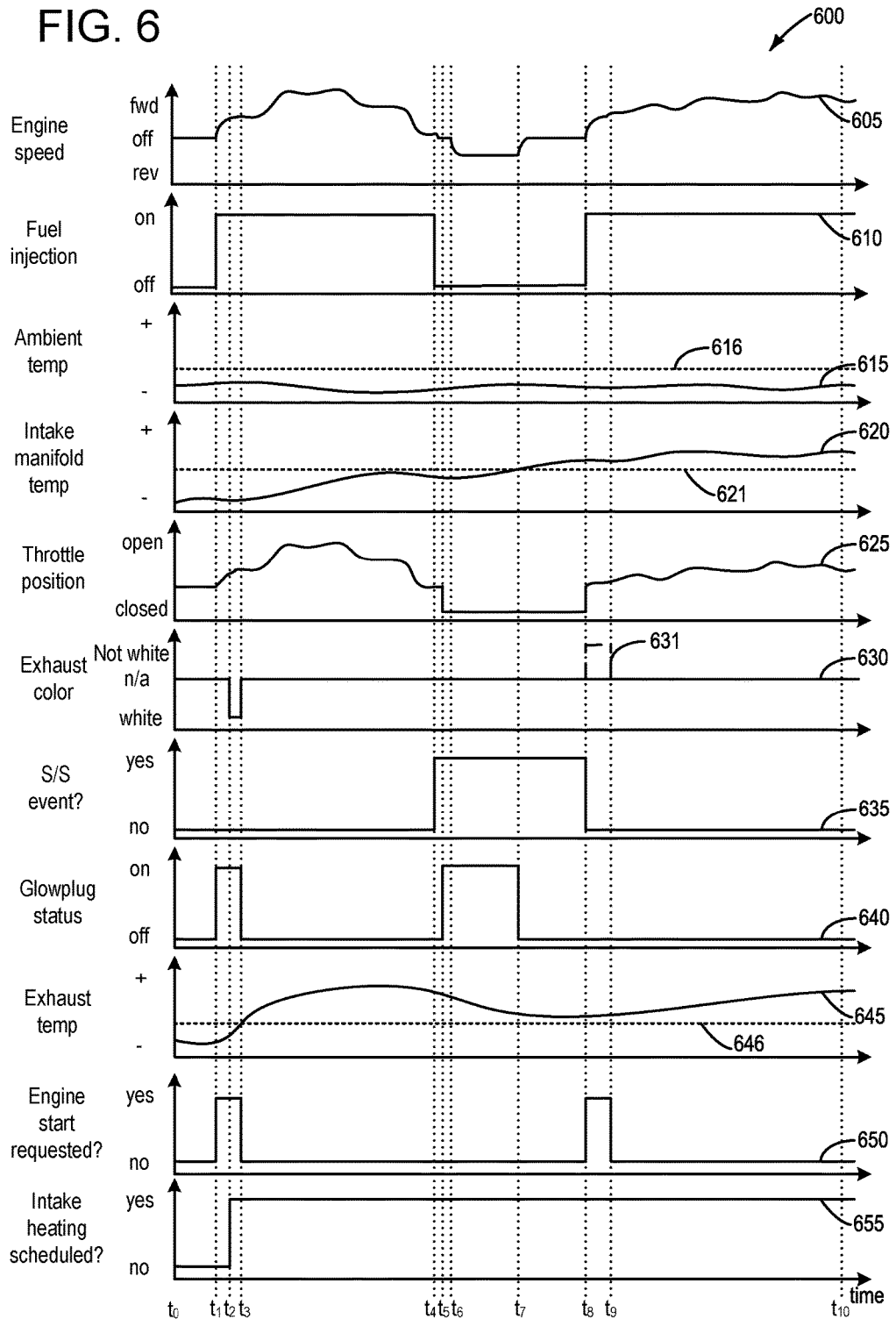

US 10,145,340 B1

SYSTEMS AND METHODS FOR HEATING A VEHICLE INTAKE MANIFOLD DURING STOP/START EVENTS

FIELD

The present description relates generally to methods and systems for controlling a vehicle engine to direct exhaust system heat to an intake manifold under cold start conditions for vehicles equipped with stop/start capability.

BACKGROUND/SUMMARY

When an internal combustion engine is started, if the intake manifold and/or intake air are cold, the low temperatures may make it difficult for fuel to vaporize in the engine cylinders. Any fuel that is incompletely vaporized may not be completely combusted. The portion of fuel that is not completely combusted at start-up and a period shortly after start-up may result in a fuel-rich exhaust mixture. Such a fuel-rich exhaust mixture may increase undesired hydrocarbon (HC) emissions and/or increased carbon monoxide levels in the exhaust.

For gasoline engines, engine heat production after startup may result in the incoming air gaining engine heat, prior to entering the engine cylinders. In other examples where the engine comprises a diesel engine, glow plugs may be employed to warm up engine cylinders upon initiation of a cold start event. However, for any vehicles equipped with stop/start (S/S) capability, where the engine may pull down (e.g. be deactivated to stop combusting air and fuel) when vehicle speed decreases to below a threshold speed, engine heat may not continue to rise monotonically, and thus at the next startup event, incoming air may not be sufficiently warmed. Such an issue may be exacerbated under conditions where ambient temperature is below a predetermined threshold, such as below freezing (e.g. <32° F.). Thus, in such an example, at a subsequent engine pull up (e.g. engine is activated to combust air and fuel), cold incoming air may result in combustion events that are not complete, thus resulting increased tailpipe emissions.

Various prior art devices have been employed to effect heat transfer to the intake air of an engine. For example, a manifold air heater system may help to raise the temperature of combustion air when intake manifold air passes through the intake manifold of the engine by means of an electrically heated element or a combustion burner using a liquid or gaseous fuel. However, the inventors have herein recognized issues with such an approach. For example, an intake manifold air heater system may add cost and complexity to a vehicle system. Furthermore, in the event that the heater is not functioning as desired, undesired emissions may result when a cold-start is initiated.

Accordingly, the inventors herein have developed systems and methods to at least partially address the above-mentioned issues. In one example, a method comprises spinning an engine of a vehicle in a reverse direction unfueled in response to an engine pull-down event until a temperature of an intake manifold of the engine rises to or above a threshold intake manifold temperature as a result of airflow from an exhaust manifold of the engine flowing through the engine and into the intake manifold. As an example, the threshold intake manifold temperature may comprise a temperature that results in a desired efficiency level of fuel combustion in response to a subsequent request to start the engine. In this way, fuel economy may be improved, and undesired emissions reduced.

In an example of the method, the engine pull-down event may comprise an S/S event that involves shut down of the engine to reduce an amount of time the engine spends idling. In some examples, spinning the engine in the reverse direction in response to the engine pull-down event may occur in response to a scheduled intake manifold heating operation. For example, scheduling the intake manifold heating operation may involve monitoring a color of an exhaust gas exiting an exhaust system of the engine at an engine start event, and responsive to an indication that the color of the exhaust gas is white, the intake manifold heating operation may be scheduled. In this way, based on an indication of poor fuel combustion at the engine start event, the intake manifold heating operation may be scheduled for subsequent engine pull-down events, so as to improve fuel combustion in response to engine start requests, which may improve fuel economy and reduce undesired emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a high-level flowchart for an example method for determining whether to schedule an intake manifold heating method for a subsequent S/S event.

FIG. 6 illustrates an example timeline for scheduling and conducting the intake manifold heating methodology depicted at FIGS. 4-5.

DETAILED DESCRIPTION

The following description relates to systems and methods for improving combustion at cold start events, particularly with regard to S/S events. Specifically, during cold ambient conditions and after a long vehicle soak (e.g. >6 hours), an engine start event may result in less than ideal combustion. More specifically, an efficiency level of combustion may be below a threshold efficiency level of combustion. For example, the threshold efficiency level may comprise a level where a desired percentage of fuel is combusted. For vehicles equipped with S/S features, which enable the engine to be pulled down when vehicle speeds drop below a threshold speed and subsequently restarted when wheel torque above a threshold wheel torque is demanded, such issues may be exacerbated. Particularly, the intake manifold may not heat sufficiently prior to a S/S event, or the intake manifold may cool too an undesirable level while the engine is pulled down at a S/S event. To remedy such a situation, it may be desirable to heat the intake manifold at S/S events where intake manifold temperature is below a threshold intake manifold temperature. Such heating may include routing hot air from an exhaust system of the vehicle to the intake manifold. It may be desirable to conduct such heating of the intake manifold after the engine spins to rest at a S/S event, to ensure the intake manifold temperature reaches the threshold intake manifold temperature prior to an engine restart request. Routing the exhaust system heat to the intake manifold may include spinning the engine in reverse, unfueled. Spinning the engine in reverse unfueled may be conducted via a motor, such as the motor depicted in the hybrid vehicle propulsion system depicted at FIG. 1. In this way, exhaust system heat may be effectively routed to the intake manifold of an engine system during S/S events, such as the engine system depicted at FIG. 2. To rotate or spin the engine in reverse unfueled, an H-bridge circuit may be utilized, the details of which are provided at FIGS. 3A-3B. FIG. 4 illustrates a high-level example methodology to determine whether to schedule intake manifold heating at S/S events for a particular drive cycle. Responsive to such scheduling, the method depicted at FIG. 5 may be utilized to heat the intake manifold at S/S events where conditions are met for doing so. FIG. 6 depicts an example timeline 600, illustrating the scheduling and conducting of intake manifold heating for S/S events, according to the methodology of FIGS. 5-6.

Figure 1:
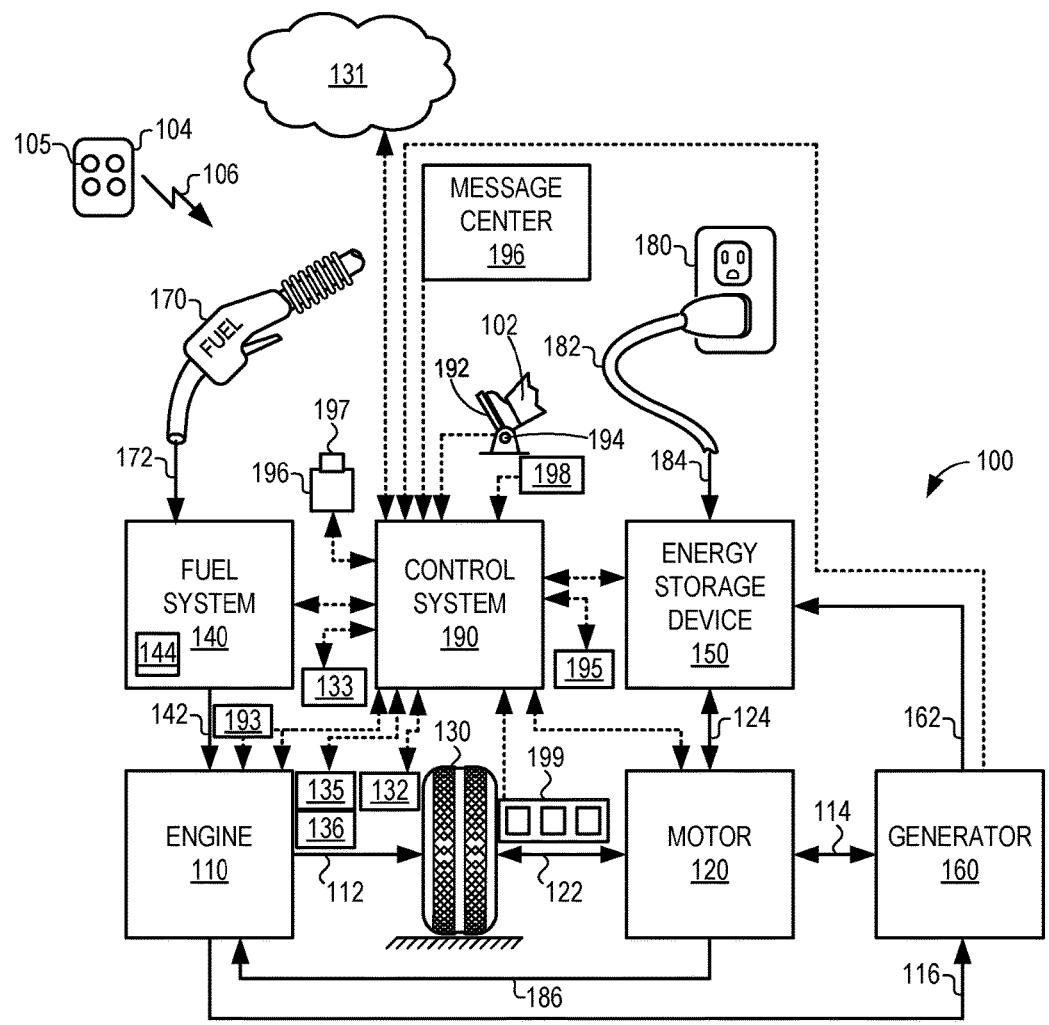
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

In another example, the engine may be equipped with a S/S feature 193, wherein the engine 110 may be automatically shut down during times when the vehicle is not moving, or when the vehicle speed is below a threshold speed, when engine speed is below a threshold engine speed, etc. Control system 190 may be connected to engine 110 and S/S feature 193, for performing the start-stop functions. Advantages to the S/S functionality may include an improvement in fuel economy over other vehicles that do not employ such technology.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in further detail below, motor 120 may be configured to rotate engine unfueled in a forward (e.g. default orientation) or reverse orientation, using energy provided via energy storage device 150, exemplified by arrow 186.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

In one example, the one or more onboard cameras 135 may be included in a vehicle exhaust smoke identification system 136. In some examples, the vehicle exhaust smoke identification system 136 may include a video processing data unit. In one example, the video processing unit may comprise controller 190, but in other examples the video processing unit may include a control computing device what is separate from, but which may be selectively electrically coupled to (or wirelessly coupled to), controller 190. In one example, the vehicle exhaust smoke identification system 136 may include a method for color recognition. In other words, the vehicle exhaust smoke identification system may include a computer vision system. In one example, the color recognition method may include storing a predefined set of colors in memory, and determining whether exhaust smoke comprises a particular color. For example, the color recognition method may include indicating whether the exhaust smoke is white, gray, black, blue-black, etc. In some examples, a confidence value may be associated with the color determination. For example, an exhaust smoke that is identified to be white may comprise a high confidence value, a mid-level confidence value, or a low-confidence value. Alternatively, a numerical system may be utilized to assign confidence value(s) to particular color determinations. For example, the numerical system may comprise numbers 1-10, or 1-100. Confidence values may increase as confidence in a particular color determination increase, and may decrease as confidence in particular color determination decrease. In some examples, a determination that the exhaust smoke is "white" may comprise the smoke being substantially white, or within a threshold of a determination that the smoke is white. More specifically, substantially white may comprise a determination that the smoke is within a predetermined threshold of being white (e.g. within a 5% margin of error or within a 10% margin of error, for example). In this way, it may be accurately determined as to the color of exhaust gas exiting the vehicle, as will be discussed in further detail below.

Figure 2:
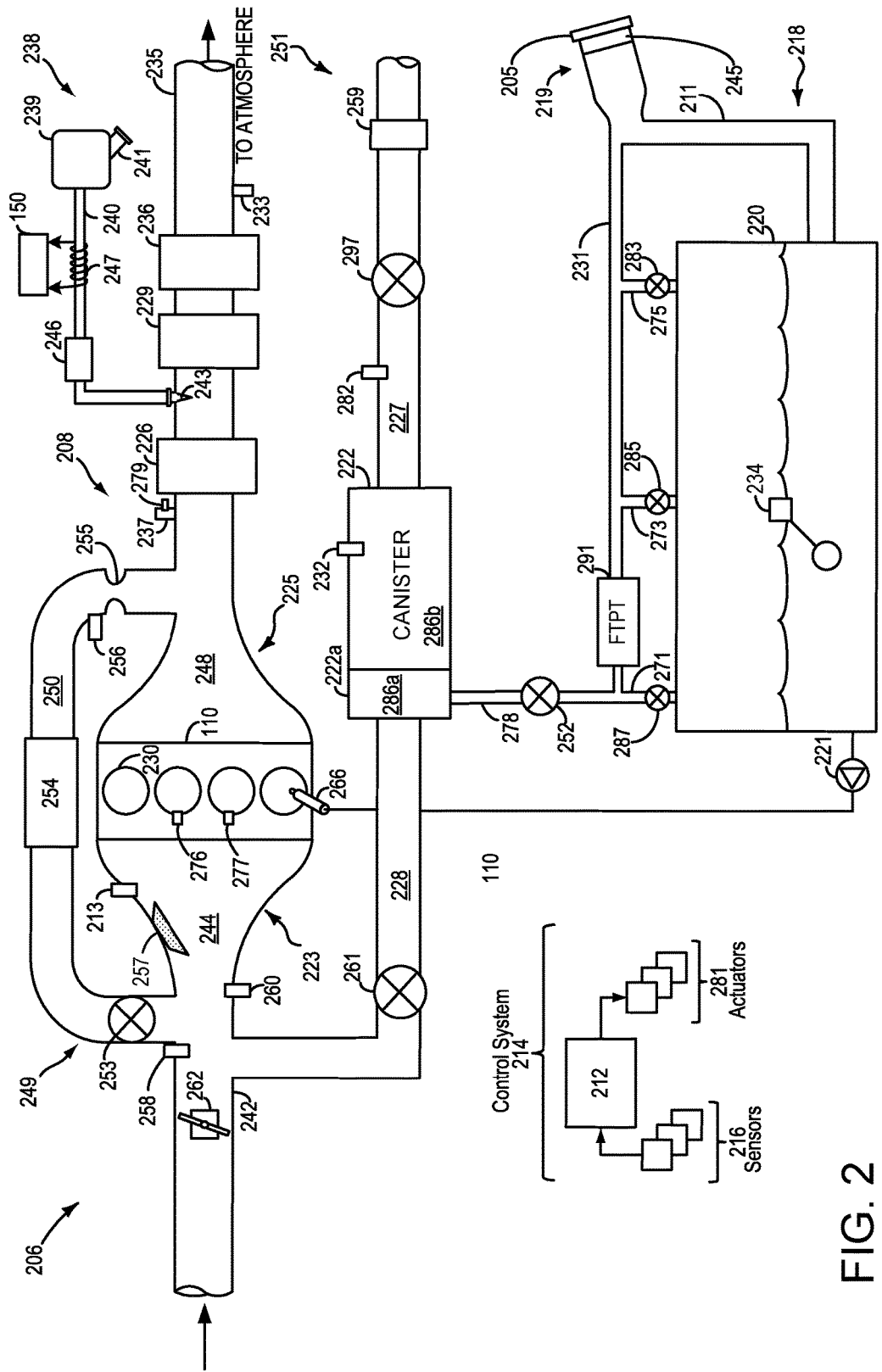
FIG. 2 schematically shows an example vehicle system with a fuel system and an evaporative emissions system.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. The engine system 208 may include an engine 110 having a plurality of cylinders 230. The engine 110 includes an engine air intake system 223 and an engine exhaust system 225. The engine air intake 223 includes a throttle 262 in fluidic communication with engine intake manifold 244 via an intake passage 242. In some examples, throttle 262 may comprise an electronic throttle. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The exhaust passage may lead to one or more exhaust after-treatment devices (e.g. 226, 229, 236), as well as a reductant delivery and storage system, such as diesel exhaust fluid (DEF) system 238, under conditions where the vehicle comprises a diesel-burning engine.

The exhaust after-treatment devices may be disposed in various orders and/or combinations along exhaust passage 235. For example, a diesel oxidation catalyst (DOC) 226 may be followed downstream by a selective catalytic reduction (SCR) catalyst 229. SCR catalyst 229 may be followed downstream by a diesel particulate filter (DPF) 236. It should be understood that the emissions control devices of the exhaust system 225 shown in FIG. 2 are exemplary in nature. Various other emission control devices and configurations may be included in engine exhaust system 225. For example, exhaust system 225 may include an SCR catalyst followed by a DPF only. In another example, the exhaust system 225 may only include an SCR catalyst. In still another example, a DPF may be located upstream of the SCR catalyst, or a combined DPF/SCR catalyst may be used.

The engine exhaust system 225 may further include a reductant delivery and/or storage system, such as DEF system 238. The DEF may be a liquid reductant, such as a urea and water mixture, stored in a storage vessel, such as a storage tank. In one example, the DEF system 238 may include DEF tank 239 for onboard DEF storage, a DEF delivery line 240 that couples the DEF tank 239 to exhaust passage 235 via an injector at or upstream of SCR catalyst 229. The DEF tank 239 may be of various forms, and may include a filler neck 241 and corresponding cap and/or cover door in the vehicle body. Filler neck 241 may be configured to receive a nozzle for replenishing DEF.

DEF system 238 may also include a DEF injector 243 in line 240 which injects DEF into the exhaust upstream of the SCR catalyst 229. DEF injector 243 may be used to control the timing and amount of DEF injections, via control system 214. DEF system 238 may further include DEF pump 246. DEF pump 246 may be used to pressurize and deliver DEF into line 240. DEF system 238 may further include a DEF line heater 247 which heats DEF line 240. For example, the DEF line heater 247 may warm the DEF fluid on the way to the DEF pump at low temperatures in order to maintain a DEF fluid viscosity. DEF line heater 247 may be a resistive heater, or various other configurations. DEF line heater 247 may be coupled to energy storage device 150, which may include a battery, and may be enabled and controlled via control system 214, for example.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. In another example, an intake temperature sensor 260 may be positioned in the intake. In yet another example, a humidity sensor 258 may be positioned in the intake.

Engine system 208 may also include an exhaust gas recirculation (EGR) system 249 that receives a portion of an exhaust gas stream exiting engine 110 and returns the exhaust gas to engine intake manifold 244 downstream of throttle 262. Under some conditions, EGR system 249 may be used to regulate the temperature and/or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 249 is shown forming a common EGR passage 250 from exhaust passage 235 to intake passage 242.

In some examples, exhaust system 225 may also include a turbocharger (not shown) comprising a turbine and a compressor coupled on a common shaft. The turbine may be coupled within exhaust passage 235, while the compressor may be coupled within intake passage 242. Blades of the turbine may be caused to rotate about the common shaft as a portion of the exhaust gas stream discharged from the engine 110 impinges upon the blades of the turbine. The compressor may be coupled to the turbine such that the compressor may be actuated when the blades of the turbine are caused to rotate. When actuated, the compressor may then direct pressurized fresh air to air intake manifold 244 where it may then be directed to engine 110. In systems where EGR passage 250 is coupled to engine exhaust 225 upstream of the turbine and coupled to intake passage 242 downstream of the compressor, the EGR system may be considered a high pressure EGR system. The EGR passage may alternatively be coupled downstream of the turbine and upstream of the compressor (low pressure EGR system).

An EGR valve 253 may be coupled within EGR passage 250. EGR valve 253 may be configured as an active solenoid valve that may be actuated to allow exhaust gas flow into intake manifold 244. The portion of the exhaust gas flow discharged by engine 110 that is allowed to pass through EGR system 249 and return to engine 110 may be metered by the measured actuation of EGR valve 253, which may be regulated by controller 212. The actuation of EGR valve 253 may be based on various vehicle operating parameters and a calculated overall EGR flow rate.

One or more EGR coolers 254 may be coupled within EGR passage 250. EGR cooler 254 may act to lower the overall temperature of the EGR flow stream before passing the stream on to intake manifold 244 where it may be combined with fresh air and directed to engine 110. EGR passage 250 may include one or more flow restriction regions 255. One or more pressure sensors 256 may be coupled at or near flow restriction region 255. The diameter of the flow restriction region may thus be used to determine an overall volumetric flow rate through EGR passage 250.

An air intake system hydrocarbon trap (AIS HC) 257 may be placed in the intake manifold of engine 110 to adsorb fuel vapors emanating from unburned fuel in the intake manifold, puddled fuel from degraded fuel injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC 257, the trapped vapors may be passively desorbed from the AIS HC and combusted in the engine 110. Thus, during engine operation, intake fuel vapors are stored and desorbed from AIS HC 257. In addition, fuel vapors stored during an engine shutdown can also be desorbed from the AIS HC during engine operation. In this way, AIS HC 257 may be continually loaded and purged, and the trap may reduce evaporative emissions from the intake passage even when engine 110 is shut down.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. Furthermore, in a case where the vehicle system 206 comprises a vehicle that uses diesel fuel, a glowplug 276 may be included for each cylinder 266. The glowplugs 276 may comprise heating devices that may aid in starting diesel engines. Alternatively, in an example where the vehicle system 206 comprises a vehicle that runs on fuel other than diesel, a spark plug 277 may be included for each cylinder 266. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261. As will be discussed in detail below, in some example the FTIV may not be included, whereas in other examples, an FTIV may be included. Accordingly, the use of an FTIV will be discussed with regard to the methods described below, where relevant. Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, temperature sensor 260, pressure sensor 291, pressure sensor 282, and canister temperature sensor 232. Exhaust gas sensor 237 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 237 may be connected with controller 212. It may be understood that the exhaust gas sensor 237 may work effectively when heated to approximately 600° F. Accordingly, in some examples the exhaust gas sensor may include heating elements 279, to enable rapid warming of the exhaust gas sensor.

Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 4-5.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct diagnostic routines. In another example, a wakeup capability may enable a circuit to wake the controller when a diagnostic is requested.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

When the engine is spun in the default direction, a vacuum is generated in the intake manifold, while a pressure is generated in the exhaust system. However, if the engine is spun in reverse, a vacuum is generated in the exhaust system, while a pressure is generated in the intake manifold. More specifically, as the engine spins in reverse, the opening of a cylinder exhaust valve (not shown) brings fresh air (and exhaust gas if present) into the cylinder, and a subsequent opening of the cylinder intake valve (not shown) evacuates the cylinder to the intake manifold.

A vehicle such as the vehicle propulsion system 100 described above comprises a hybrid electric vehicle, and as such, the vehicle motor (e.g. 120) may be utilized to spin or rotate the engine unfueled using power supplied via the onboard energy storage device (e.g. 150), such as a battery. In some examples, which will be discussed in further detail below, it may be desired to spin the engine in a reverse orientation (opposite that of the default direction). For example, under situations of a cold-start condition, if temperatures in the exhaust system exceed a threshold exhaust system temperature, then the engine may be rotated in the reverse orientation, to draw exhaust heat through the engine and into the intake manifold. In this way, the intake system may be kept warm, such that combustion may be improved for the cold-start condition. One such example may include a situation where a S/S event occurs under cold (e.g. below 32° F.) ambient temperature conditions. With the engine stopped, the intake may cool to a point where incomplete combustion may occur at the next engine startup event. However, the exhaust system may remain hot (e.g. may take a long time to cool), such that the exhaust heat may be effectively utilized for heating the intake manifold. Heating the intake manifold in this way may reduce or avoid undesired emissions during cold start events. The inventors herein also have recognized that the cold air in the intake manifold may lower intake manifold pressure and accordingly increase engine pumping losses under throttled conditions at following an engine start. By heating the intake manifold before engine start and subsequent idle, intake manifold pressure is increased thus reducing pumping losses at idle and improving fuel economy.

Figure 3A:
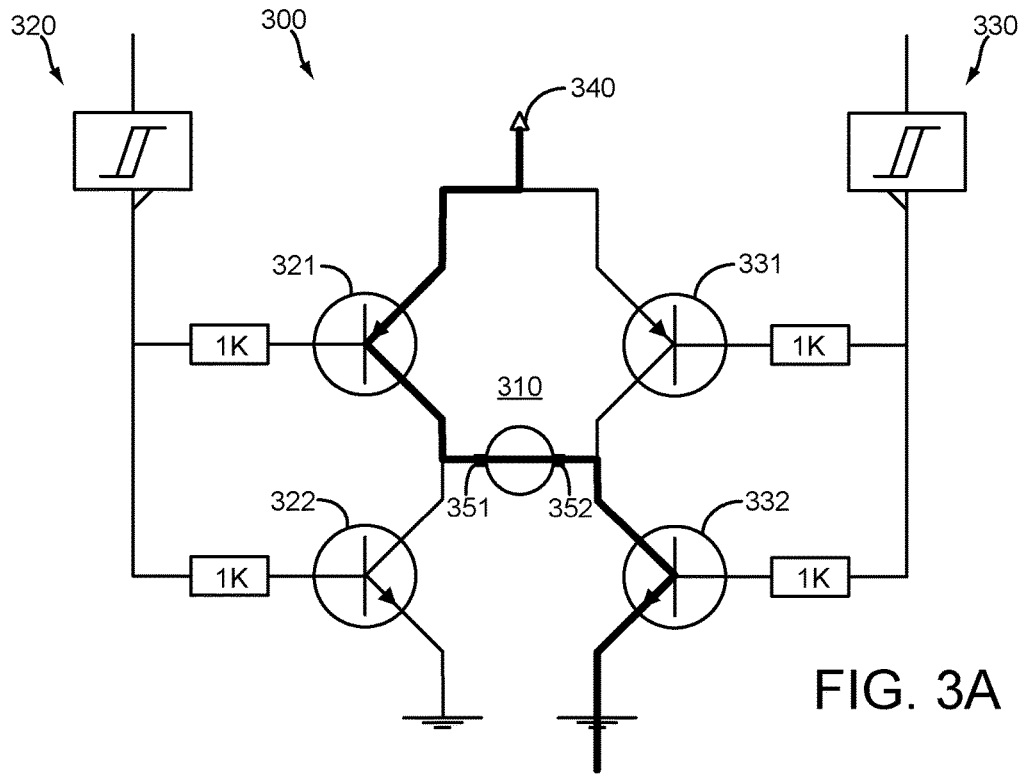
FIGS. 3A-3B schematically show an example H-bridge circuit which may be used to rotate a vehicle engine in a forward or reverse direction.
Figure 3B:
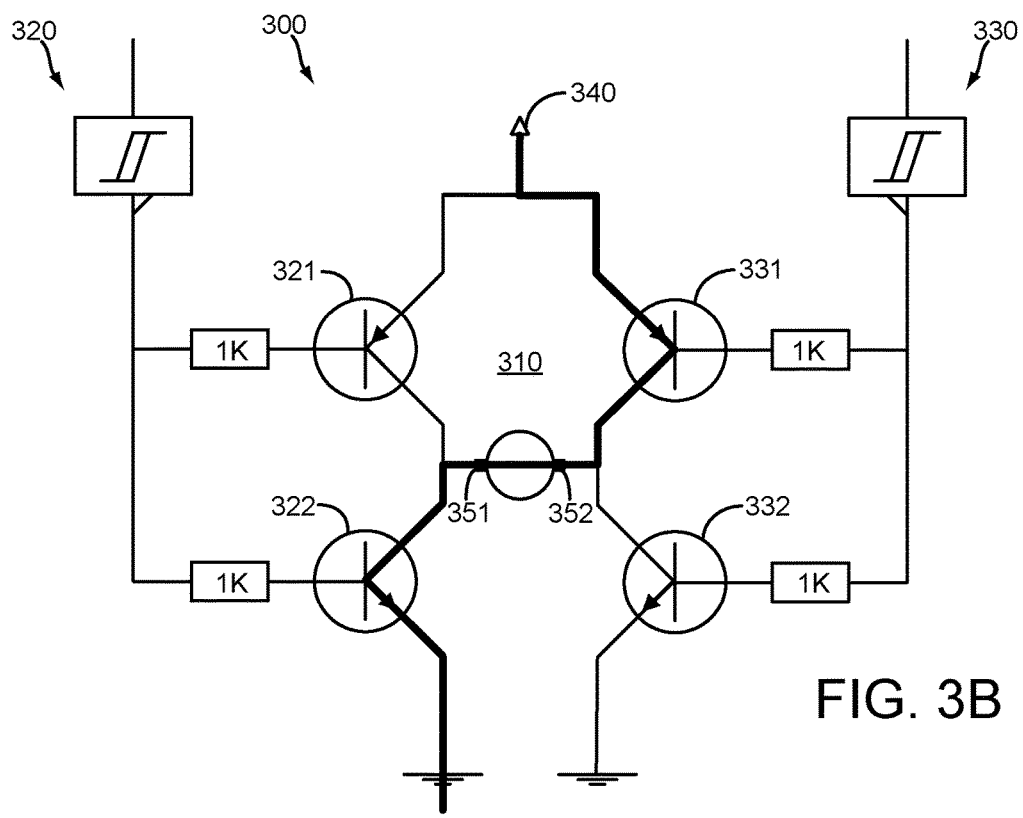

Turning now to FIGS. 3A-3B, they show an example circuit 300 that may be used for reversing a spin orientation of an electric motor. Circuit 300 schematically depicts an H-Bridge circuit that may be used to run a motor 310 in a first (forward) direction and alternately in a second (reverse) direction. Circuit 300 comprises a first (LO) side 320 and a second (HI) side 330. Side 320 includes transistors 321 and 322, while side 330 includes transistors 331 and 332. Circuit 300 further includes a power source 340.

In FIG. 3A, transistors 321 and 332 are activated (energized), while transistors 322 and 331 are off. In this confirmation, the left lead 351 of motor 310 is connected to power source 340, and the right lead 352 of motor 310 is connected to ground. In this way, motor 310 may run in a forward direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 3B, transistors 322 and 331 are activated (energized), while transistors 321 and 332 are off. In this confirmation, the right lead 352 of motor 310 is connected to power source 340, and the left lead 351 of motor 310 is connected to ground. In this way, motor 310 may run in a reverse direction.

Thus, FIGS. 1-3B may enable a system for a hybrid vehicle, including an engine with an intake manifold and an exhaust system; a motor, configured to operate via energy supplied from an onboard energy storage device; a S/S system; and a controller, storing instructions in non-transitory memory that, when executed, cause the controller to schedule an intake manifold heating operation for an engine pull-down event corresponding to a S/S event in response to an indication of poor combustion at an engine start event initiated after a predetermined duration that the engine has been inactive, where the engine start event initiated after the predetermined duration does not comprise the start/stop event. The system may include the controller storing instructions to conduct the intake manifold heating operation via rotating the engine in reverse unfueled via the motor, to direct hot air from the exhaust system to the intake manifold, in response to the engine pull-down event where the intake manifold heating operation is scheduled.

In one example, such a system may further comprise an onboard camera, a vehicle exhaust smoke identification system, and an ambient temperature sensor. In such an example, the controller may store further instructions to indicate poor combustion at the engine start event in response to the onboard camera indicating that a color of an exhaust gas exiting the exhaust system during the engine start event is white, and further responsive to an indication that an ambient temperature is below a threshold ambient temperature.

In another example, such a system may additionally or alternatively include an intake manifold temperature sensor, an exhaust system temperature sensor, and a throttle. In such an example, the controller may store further instructions to conduct the intake manifold heating operation in response to an intake manifold temperature, as monitored via the intake manifold temperature sensor, below a threshold intake manifold temperature at the time of the engine pull-down event or during a time period that the engine is pulled-down prior to being restarted. Conducting the intake manifold heating operation may further include controlling the throttle to a substantially closed position for conducting the intake manifold heating operation, and aborting the intake manifold heating operation if an exhaust system temperature falls below a threshold exhaust system temperature, during the conducting the intake manifold heating operation.

Turning now to FIG. 4, a flowchart for a high-level example method 400 is shown for determining whether to schedule an intake heating operation for a subsequent S/S event in a drive cycle, is shown. More specifically, in response to a request to start an engine after the engine has been off with the vehicle stationary for a predetermined time (e.g. soak time greater than a threshold soak duration), based on ambient conditions and exhaust color during the starting, intake manifold heating may be scheduled for subsequent S/S events during the drive cycle commencing at the request to start the engine. Method 400 will be described in reference to the systems described in FIGS. 1-3B, though it should be understood that method 400 may be applied to other systems without departing from the scope of this disclosure. Method 400 may be carried out by a controller, such as controller 212, and may be stored as executable instructions in non-transitory memory. Instructions for carrying out method 400 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as spark plug(s) (e.g. 277), fuel injector(s) (e.g. 266), glowplug(s) (e.g. 276), motor (e.g. 120), throttle (e.g. 262), CPV (e.g. 261), EGR valve (e.g. 253), etc., according to the methods depicted below.

Method 400 begins at 405, and may include estimating and/or measuring engine operating conditions. These may include, for example, engine speed, desired torque (for example, from a pedal-position sensor), manifold pressure (MAP), manifold air flow (MAF), BP, engine temperature, catalyst temperature, intake temperature, air temperature, knock limits, etc. Proceeding to 410, method 400 may include indicating whether an engine start event is in progress. More specifically, at 410, method 400 may include indicating whether an engine start event is in progress, where the engine start event comprises a request to start the engine after a predetermined soak duration has elapsed. For example, a "soak" may refer to a period of time that the engine has been deactivated (e.g. off, or not combusting air and fuel). An engine start may comprise a remote engine start request, a key-on event, depression of a start button on a dash of the vehicle, etc. If an engine start event is not indicated at 410, method 400 may proceed to 415. At 415, method 400 may include maintaining current vehicle operating parameters. For example, if the vehicle is in operation, where the engine is at least in part, operating to propel the vehicle, then the engine may be maintained in operation. Another example may include a situation where the engine is off, but where the vehicle is being propelled via an electric-only mode of operation. In such an example, the electric-only mode of operation may be maintained. In other examples, the vehicle may be at rest, with the engine and/or motor off. In such an example, the current operating conditions may be maintained at 415. Method 400 may then end.

Returning to 410, responsive to an indication of an engine start event, method 400 may proceed to 420. At 420, method 400 may include indicating whether ambient temperature is below a threshold ambient temperature. As discussed above, in one example the threshold ambient temperature includes 32° F. In other examples, the threshold may be 40° F. In another example, the threshold may be 25° F. In other examples, the threshold may be 20° F. Such examples are meant to be illustrative, and other threshold temperatures are within the scope of this disclosure. Ambient temperature may be monitored, for example, via an ambient temperature sensor (e.g. 198). If, at 420, ambient temperature is indicated to be above the threshold ambient temperature, method 400 may proceed to 425, and may include starting the engine without monitoring exhaust exiting the exhaust passage (e.g. 235) during the engine start. In other words, because ambient temperature is indicated to be above the threshold ambient temperature, it may be expected that the fuel provided to the engine during the engine start event may be combusted as desired. In other words, fuel combustion may be complete, or nearly complete. Thus, starting the engine may include providing fuel and spark to engine cylinders (in a case where the vehicle comprises an engine with spark plugs), or may include providing fuel and activating glowplug(s) (in a case where the vehicle comprises a diesel vehicle where engine cylinders include glowplugs). Method 400 may then end.

Returning to 420, in response to an indication that ambient temperature is less than the threshold ambient temperature, method 400 may proceed to 430. At 430, method 400 may include monitoring a color of the exhaust exiting the exhaust passage during the engine start. More specifically, one or more onboard camera(s) (e.g. 135) may be utilized to monitor color of the exhaust exiting the exhaust passage. As discussed, the onboard camera(s) may be included in a vehicle exhaust smoke identification system (e.g. 136), which may include a computer vision system and which may be configured to accurately assess color of exhaust smoke exiting the vehicle exhaust passage. Such onboard camera(s) may in some examples comprise one or more cameras positioned at the rear of the vehicle, and may be configured to monitor obstacles, etc., while the vehicle is backing up (e.g. moving in reverse). Alternatively, in other examples, the camera(s) for monitoring the exhaust may be different from those configured to monitor obstacles, etc., while the vehicle is being propelled in reverse. At any rate, it may be understood that, responsive to an engine start condition after a long soak where ambient temperature is lower than the ambient temperature threshold, onboard camera(s) may be utilized to indicate whether the exhaust gas exiting the exhaust passage during the start event is white, or not.

Accordingly, at 435, method 400 may include indicating whether the exhaust exiting the exhaust passage is white. In some examples, the exhaust may be classified as being white in response to the determination of the exhaust gas being white comprising a high-confidence result, or a confidence level greater than a threshold (e.g. greater than 90 out of 100 if a numerical confidence scale is utilized). If, at 435, it is indicated that the exhaust gas exiting the vehicle during the engine start event is not white, method 400 may proceed to 440. At 440, method 400 may include starting the engine without scheduling intake manifold heating operations for any subsequent S/S events during the drive cycle commencing at the engine start event discussed above at 410. In other words, starting the engine may include providing fuel and spark to engine cylinders (in a case where the vehicle comprises an engine with spark plugs), or may include providing fuel and activating glowplug(s) (in a case where the vehicle comprises a diesel vehicle where engine cylinders include glowplugs). Method 400 may then end.

Figure 5:
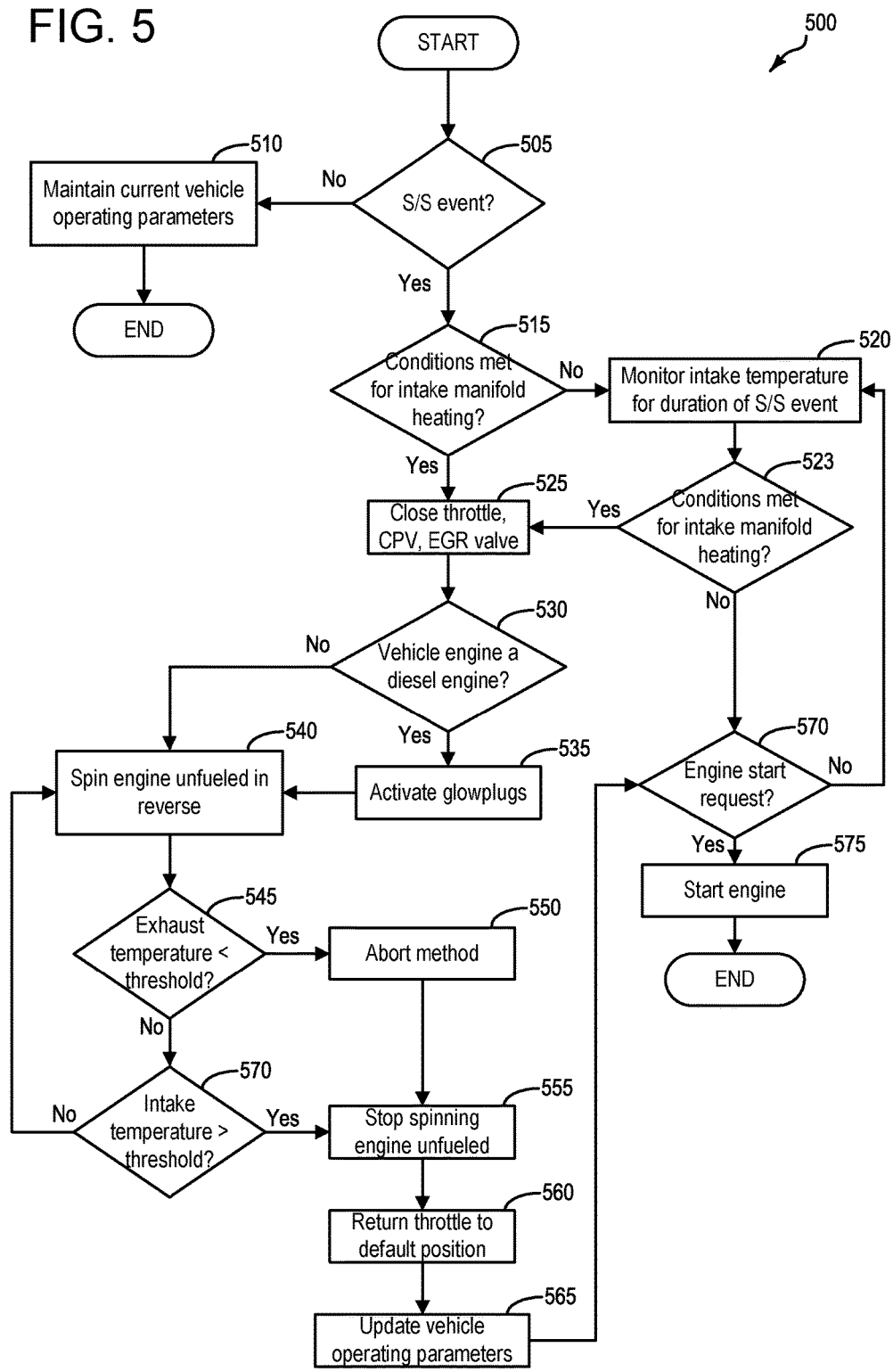
FIG. 5 shows a high-level flowchart for an example method for conducting an intake manifold heating operation at start/stop event(s) where intake manifold heating is scheduled.

Alternatively, returning to 435, in response to an indication that white smoke is being emitted from the exhaust passage, method 400 may proceed to 445. At 445, method 400 may include scheduling intake manifold heating for any subsequent S/S event for the drive cycle commencing at the engine start event discussed above at 410. Such a method is depicted at FIG. 5. Scheduling the intake manifold heating method for subsequent S/S events may include storing the instructions at the controller, for example. Method 400 may then end.

Thus, turning to FIG. 5, a high-level flowchart for an example method 500 for heating an intake manifold in response to S/S events, is shown. More specifically, method 500 may comprise a sub-method of method 400 depicted at FIG. 4. Method 500 may include routing exhaust system heat to the intake manifold in response to a S/S event where ambient temperature is below the ambient temperature threshold, and where an intake manifold temperature is below a threshold intake manifold temperature. Method 500 may be conducted at S/S events in response to such a method being scheduled, as discussed above at FIG. 4.

Method 500 will be described in reference to the systems described in FIGS. 1-3B, though it should be understood that method 500 may be applied to other systems without departing from the scope of this disclosure. Method 500 may be carried out by a controller, such as controller 212, and may be stored as executable instructions in non-transitory memory. Instructions for carrying out method 500 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as spark plug(s) (e.g. 277), fuel injector(s) (e.g. 266), glowplug(s) (e.g. 276), motor (e.g. 120), throttle (e.g. 262), CPV (e.g. 261), EGR valve (e.g. 253), etc., according to the methods depicted below.

At 505, method 500 may include indicating whether a S/S event is in progress, or not. In response to the indication that a S/S event is not in progress, method 500 may proceed to 510, and may include maintaining current vehicle operating parameters. More specifically, if the vehicle is being propelled at least in part via the engine, then engine operation may be maintained. If the engine is being propelled at least in part via the motor, then operation of the motor may be maintained. In other examples, if the vehicle is not in operation, then the vehicle may be maintained in a non-operational status. Method 500 may then end.

Returning to 505, in response to a S/S event being indicated, method 500 may proceed to 515. At 515, method 500 may include indicating whether conditions are met for conducting heating of the intake manifold. Conditions being met for conducting intake manifold heating may include an intake manifold temperature below a threshold intake manifold temperature, as monitored via, for example, the intake temperature sensor (e.g. 260). The threshold intake manifold temperature may comprise a temperature where, above the threshold it may be expected that the majority of fuel provided to the engine may be combusted at the next engine start event. In other words, when temperature of the intake manifold is greater than the threshold intake manifold temperature, an engine start event may be expected to be substantially non-polluting. Engine start events where the majority of fuel provided to the engine is combusted may comprise an engine start event where exhaust smoke is more a grey color, as opposed to a white color. Conditions being met at 515 may additionally or alternatively include an exhaust system temperature greater than a threshold exhaust system temperature. Exhaust system temperature may be monitored via, for example, an exhaust system temperature sensor (e.g. 233). The threshold exhaust system temperature may comprise a temperature where exhaust heat may be routed to the intake manifold to raise intake manifold temperature to at least the threshold intake manifold temperature, without exhaust system temperature dropping below an exhaust catalyst light-off temperature, for example. However, in other examples, the threshold exhaust system temperature may comprise the light-off temperature. It may be understood that exhaust system temperature may increase during engine operation faster than intake manifold temperature, due to the lower thermal mass of the exhaust manifold as compared to the intake manifold, and additionally due to the flow of hot exhaust gases to the exhaust system during engine operation.

Conditions being met at 515 may additionally or alternatively include an indication that a state of charge (SOC) of an onboard energy storage device (e.g. 150) is greater than a threshold SOC. The threshold SOC may comprise a SOC where the engine may be spun in reverse for a predetermined time duration (e.g. 30 seconds or less, 1 minute or less, 2 minutes or less, 3 minutes or less, 5 minutes or less, etc.), without depleting the onboard energy storage device to an undesirable level. For example, if the SOC is such that by spinning the engine in reverse, SOC may be depleted to a point where subsequent events utilizing the onboard energy storage device may be adversely affected, conditions may not be indicated to be met for intake manifold heating.

Conditions being met at 515 may additionally or alternatively include an indication that ambient temperature is below a threshold ambient temperature. For example, the threshold ambient temperature may comprise the threshold ambient temperature discussed above at step 420 of method 400, for example.

In some examples where the vehicle is equipped with capability for V2V, V2I2V and/or V2I or V2X technology, conditions being met may include an indication that a particular S/S event is expected or inferred to be greater than a first threshold S/S duration, but less than a second threshold S/S duration. More specifically, such technology may be utilized to approximate a duration of the S/S event. If the S/S event is approximated to be a short duration (less than the first threshold S/S duration), for example less than 10 seconds, then conditions may not be indicated to be met as conducting the intake manifold heating operation may utilize power stored in the onboard energy storage device without adequately heating the intake manifold prior to a request to restart the engine. Alternatively, if it is inferred that the S/S duration is greater than the second threshold S/S duration, then transferring exhaust heat back to the intake manifold may not be desirable, as the net effect may be no gain, as the catalyst may have to be lit off again at the next start if it is cooled too much. Thus, by only enabling the transfer of exhaust heat to the intake manifold under conditions where an inferred S/S duration is greater than the first threshold S/S duration, but less than the second threshold S/S duration, methodology for heating the intake manifold may be optimized, and aborts of the methodology reduced.

If, at 515, conditions are not indicated to be met for conducting the intake manifold heating operation, method 500 may proceed to 520. At 520, method 500 may include continuing to monitor intake manifold temperature for the duration of the S/S event. More specifically, it may be understood that, immediately responsive to a S/S event, intake manifold temperature may be above the threshold intake manifold temperature due to the engine being in operation, and rejecting heat to the intake. However, in situations where ambient temperature is below the threshold ambient temperature, the intake manifold may rapidly cool. Furthermore, it may be understood that the intake manifold may comprise a large thermal mass in comparison to the exhaust manifold. Thus, the intake manifold may take a long time to heat to the threshold intake manifold temperature, such that it may be likely that, even with the engine running after the initial engine start event (see step 410 of method 400), the intake manifold may not reach the threshold intake manifold temperature before a S/S event commences.

Accordingly, proceeding to 523, method 500 may again include indicating whether conditions are met for conducting intake manifold heating. In other words, if intake manifold temperature was not below the threshold intake manifold temperature at 515, but becomes less than the threshold intake manifold temperature during the S/S event where the engine is off, then conditions may be met at 523 for conducting the intake manifold heating method.

If, at 523, conditions are not indicated for conducting intake manifold heating, method 500 may proceed to 570. At 570, method 500 may include indicating whether an engine start is requested. For example, a vehicle operator may step down on an accelerator pedal, requesting wheel torque. A requested wheel torque greater than a threshold wheel torque, or an accelerator pedal position greater than a threshold accelerator pedal position, may indicate a request to start the engine. If, at 570, an engine start is not requested, method 500 may return to 520, and may continue to monitor intake manifold temperature for the duration of the S/S event. Alternatively, if an engine start event is requested, method 500 may proceed to 575 and may include starting the engine. As discussed above, starting the engine may include providing fuel and spark in the case where the engine includes spark plugs, or may include providing fuel and activating glowplugs in a case where the vehicle comprises a diesel vehicle that includes glowplugs for engine cylinders. Responsive to starting the engine, method 500 may then end. However, it may be understood that for any subsequent S/S events in the current drive cycle, method 500 may again be utilized to heat the intake manifold, responsive to conditions being met to do so.

Alternatively, if conditions are indicated to be met for conducting intake manifold heating at 515, or at 523, method 500 may proceed to 525. At 525, method 500 may include closing the throttle (e.g. 262). Closing the throttle may serve to trap heat inside the intake manifold, for the purpose of heating the intake manifold. In one example, closing the throttle may include fully closing the throttle. In another example, closing the throttle may include closing the throttle to a threshold closed state (e.g. 95% closed).

Furthermore, at 525, method 500 may include closing a CPV (e.g. 261), and closing an EGR valve (e.g. 253), for vehicles equipped with such valves. For example, if the CPV and/or EGR valve were not commanded closed, then heat may not be effectively routed to the intake manifold via spinning the engine in reverse.

Proceeding to 530, method 500 may include indicating whether the vehicle is a vehicle that includes a diesel engine, or not. If the vehicle is indicated to include a diesel engine with glowplugs coupled to engine cylinders, method 500 may proceed to 535, and may include activating one or more of the glowplugs. In one example, activation of the one or more glowplugs may be dependent on SOC of the onboard energy storage device, and may be further dependent on intake manifold temperature. For example, the farther below the threshold intake manifold temperature, the greater the number of glowplugs which may be activated. In another example, the farther below the threshold intake manifold temperature, the greater the amount of energy supplied to the glowplug(s), provided the SOC of the onboard energy storage device remains above the threshold SOC (discussed above). In still other examples, activation (number of glowplugs activated and/or energy amount supplied to the glowplug(s)) of glowplugs may be a function of exhaust system temperature. For example, the higher the exhaust system temperature, the lesser the number of glowplugs that may be activated and/or the lesser the amount of energy delivered to the glowplugs may be supplied.

In order to determine how many glowplugs to activate, and at what energy level, one or more lookup tables may be stored at the controller. For example, such a lookup table or tables may include information as to how many glowplugs to activate, and at what energy level, as a function of intake manifold temperature and/or exhaust system temperature.

Whether the vehicle includes glowplugs or not, method 500 may proceed to 540, and may include spinning the engine unfueled in reverse at a predetermined engine speed (e.g. 500 RPM). In some examples, spinning the engine in reverse may not comprise a predetermined engine speed, but instead may comprise a variable engine speed, where speed may be a function of intake manifold temperature. For example, the lower the intake manifold temperature from the threshold intake manifold temperature, the faster the engine may be spun in order to ensure that the intake manifold temperature is raised to the threshold intake manifold temperature within a predetermined amount of time.

As discussed above, spinning the engine unfueled in reverse may include configuring an H-bridge circuit (depicted above at FIGS. 3A-3B) to enable the motor (e.g. 120) to rotate the engine in a reverse direction. It may be understood that the reverse direction is opposite that of the direction the engine spins when combusting air and fuel. By spinning the engine in reverse, a vacuum may be generated in the exhaust system, while a pressure may be generated in the intake manifold. Operating the engine as such may thus draw exhaust heat into the intake manifold.

While spinning the engine in reverse unfueled, method 500 may proceed to 545, and may include indicating whether exhaust system temperature has decreased below the threshold exhaust system temperature. More specifically, as exhaust heat is routed from the exhaust system to the intake manifold, the exhaust system temperature may decrease accordingly. Exhaust system temperatures below a catalyst light-off temperature may be undesirable, for a subsequent engine start. Thus, if at 545, it is indicated that exhaust system temperature has decreased to or below the threshold exhaust system temperature, method 500 may proceed to 550. Furthermore, while not explicitly illustrated, at 545, method 500 may include indicating whether a temperature of an exhaust gas sensor (e.g. 237) drops below a threshold exhaust gas sensor temperature. If, so, one or more heaters (e.g. 279) associated with the exhaust gas sensor may be activated, to raise the temperature of the exhaust gas sensor to the threshold exhaust gas sensor temperature.

At 550, responsive to exhaust system temperature below the threshold exhaust system temperature, method 500 may include aborting the method. Aborting the method may include stopping spinning the engine unfueled in reverse at 555, and returning the throttle to a default position (e.g. position it was in prior to commanding it closed at step 525) at step 560. Furthermore, if glowplugs were activated during the spinning the engine in reverse, glowplugs may be deactivated. Such steps may be carried out by the controller, for example. Proceeding to 565, method 500 may include updating vehicle operating parameters. For example, it may be indicated that a routine was conducted in order to increase intake manifold temperature during a S/S event, but that the routine was aborted because exhaust system temperatures dropped to below the threshold exhaust system temperature. Such an indication may be stored at the controller, for example. As discussed above, in examples where the vehicle includes V2V or V2X technologies, such aborts may be reduced or eliminated by only enabling the intake manifold heating methodology to commence responsive to the predicted S/S duration being within a specified window (e.g. greater than the first threshold S/S duration but less than the second threshold S/S duration).

Proceeding to 570, method 500 may include indicating whether an engine start is requested. As discussed above, an engine start event may include a requested wheel torque greater than a threshold wheel torque, an accelerator pedal position greater than a threshold position, etc. Responsive to such a request to start the engine, method 500 may proceed to 575, and may include starting the engine to combust air and fuel. Method 500 may then end.

Alternatively, returning to 545, responsive to exhaust system temperature remaining above the threshold exhaust system temperature while the engine is spun in reverse, method 500 may proceed to 570. At 570, method 500 may include indicating whether intake manifold temperature is greater than the threshold intake manifold temperature. In other words, at 570, method 500 may determine whether the routing of exhaust heat to the intake manifold was sufficient to raise intake manifold temperature to above the threshold intake manifold temperature. If intake manifold temperature is not at or above the threshold intake manifold temperature at 570, method 500 may return to 540, and may include continuing to spin the engine unfueled in reverse to continue routing exhaust system heat to the intake manifold.

Responsive to intake manifold temperature increasing to or beyond the threshold intake manifold temperature, method 500 may proceed to 555. Steps 555 through 575 are the same as those described above, and thus will not be repeated here for brevity. Briefly, the engine may be stopped from spinning unfueled, the throttle may be returned to its original position prior to being commanded closed, glowplug(s) (where included) may be deactivated, and vehicle operating parameters may be updated. In some examples, the throttle may be maintained closed until an engine start request is indicated, in order to trap heat in the intake manifold for as long as possible prior to the requested engine start. Updating vehicle operating parameters responsive to the intake manifold temperature reaching or exceeding the threshold intake manifold temperature may include storing the result at the controller, that intake manifold temperature was successfully raised to or above the threshold intake manifold temperature. Furthermore, it may be understood that, although intake manifold temperature was raised to or above the threshold intake manifold temperature, if an engine start request is not initiated soon after, the intake manifold temperature may again drop below the threshold. Accordingly, at 570, if an engine start event is not indicated, then the methodology described at FIG. 5 may be repeated, to enable intake manifold temperatures to again be raised prior to an engine start request.

Responsive to receiving an engine start request, method 500 may proceed with starting the engine, as discussed above. Method 500 may then end.

Turning now to FIG. 6, an example timeline 600 is shown for determining whether to schedule an intake manifold heating routine at S/S events of a drive cycle, and if so, conducting such heating methodology in response to S/S events. Timeline 600 includes plot 605, indicating engine speed (e.g. RPM), over time. The engine may be spun or rotated in either a forward (fwd) or reverse (rev) direction, or may be off. Timeline 600 further includes plot 610, indicating whether fuel injection to one or more engine cylinder(s) is on, or off, over time. Timeline 600 further includes plot 615, indicating ambient temperature, over time. Line 616 depicts a threshold ambient temperature which, if ambient temperature is below the threshold, heating of the intake manifold at S/S events may be scheduled and/or conducted. Timeline 600 further includes plot 620, indicating a temperature of the intake manifold, over time. Line 621 represents a threshold intake manifold temperature which may represent a desired intake manifold temperature for conducting an engine start event, such that the majority (e.g. an expected or desired amount) of fuel is combusted during the engine start event. Timeline 600 further includes plot 625, indicating a position of a throttle (e.g. 262), over time. The throttle may be open, or closed. In this example, it may be understood that the throttle being open includes the throttle being fully open, or completely open, and the throttle being closed includes the throttle being fully closed, or completely closed.

Timeline 600 further includes plot 630, indicating exhaust color, over time. Exhaust color may be understood to refer to a color of the exhaust gas exiting the exhaust passage of the vehicle. Timeline 600 further includes plot 635, indicating whether a stop/start event is encountered (yes) or not (no) in the drive cycle depicted by timeline 600. Timeline 600 further includes plot 640, indicating a status of glowplugs included in the vehicle engine, over time. Thus, it may be understood that in example timeline 600, the vehicle engine comprises a diesel engine. Timeline 600 further includes plot 645, indicating a temperature of the vehicle exhaust system (e.g. 225). Line 646 represents the threshold exhaust system temperature where, if the temperature of the exhaust system drops below the threshold while conducting methodology to heat the intake manifold, such a method may be aborted. Timeline 600 further includes plot 650, indicating whether an engine start event is requested (yes) or not (no), over time. Timeline 600 further includes plot 655, indicating whether intake manifold heating is scheduled for the current drive cycle (yes) or not (no), over time.

At time t0, the engine is not in operation (plot 605) with fuel injection off (plot 610). Ambient temperature (plot 615) is below the threshold ambient temperature (line 616). In this example, it may be understood that the threshold ambient temperature comprises 32° F. With ambient temperature below the threshold, intake manifold temperature (plot 620) is below the threshold intake manifold temperature (line 621). The throttle position (plot 625) comprises a position the throttle was in at the last engine shutdown event. The vehicle is not currently in an engine start event after a long soak at time to, and thus it is not applicable (n/a) what color the exhaust is, as there is no exhaust to measure at time t0. The engine-off status at time t0 may be understood to comprise an engine-off condition, where the engine has been off for at least a threshold duration (e.g. 6 hours or greater), and where the vehicle has not been propelled via an electric source of energy during the time the engine was off. In other words, the engine-off status does not represent a S/S event (plot 635). As the engine is off and an engine start is not requested (plot 650), glowplug(s) are off (plot 640). Exhaust system temperature (plot 650) is below the threshold exhaust system temperature (line 646), and intake heating has not been scheduled (plot 655), as an engine start request has not been initiated since the last engine-off event (e.g. the engine has been in a soak condition).

At time t1, an engine start is requested (plot 650). As the vehicle includes a diesel engine, and because ambient temperature is below the threshold ambient temperature (line 616), glowplugs are activated (plot 640) to provide heat to engine cylinders. Further, fuel is provided to the engine (plot 610), to initiate the requested start event. Between time t1 and t2, engine speed increases in conjunction with the engine start event initiated at time t1.

As the engine start request occurred under conditions where ambient temperature is below the threshold ambient temperature, it may be understood that the onboard camera(s) (e.g. 135) may be controlled via the controller to record video and/or images of the exhaust exiting the exhaust passage of the exhaust system during the engine start event initiated at time t1. Furthermore, the vehicle exhaust smoke identification system (e.g. 136) may be utilized for color recognition purposes, to indicate to the controller whether the exhaust smoke is white, or another color.

At time t2, it is indicated that the exhaust exiting the exhaust passage is, in fact, white. Thus, with ambient temperature below the threshold ambient temperature, and with the indication of white smoke exiting the exhaust, intake manifold heating is scheduled (plot 655) for any subsequent S/S events during the current drive cycle initiated at time t1. By time t3, it may be understood that the engine start event is concluded, and the engine is operating to combust air and fuel. Thus, an engine start is no longer requested (plot 650), and accordingly, the glowplug(s) are deactivated (plot 640), and images/video is stopped from being acquired (plot 630).

Between time t3 and t4, the vehicle is propelled at least in part, via the engine. As illustrated between time t3 and t4, exhaust system temperature (plot 645) rises faster than intake manifold temperature. The faster rise in exhaust system temperature is due to the lower thermal mass of the exhaust manifold, and the result of hot exhaust gases being exhausted to the exhaust system. More specifically, between time t3 and t4, exhaust system temperature is above the threshold exhaust system temperature, which in this example may be understood to comprise exhaust catalyst light-off temperature. However, between time t3 and t4, intake manifold temperature remains below the threshold intake manifold temperature. Thus, it may be understood that the cold ambient temperatures, coupled with the large thermal mass of the intake manifold, is preventing the intake manifold from warming up to above the threshold intake manifold temperature.

At time t4, a S/S event is initiated (plot 635). As discussed above, a S/S event may be initiated when vehicle speeds are below a threshold speed, thus it may be understood that at time t4, a S/S event is requested, via the controller. The S/S event may be a function of vehicle speed, accelerator pedal position, engine speed, etc. With the S/S event initiated at time t4, fuel injection is stopped (plot 610). Furthermore, with intake heating scheduled as a result of the ambient temperature below the threshold ambient temperature, and further responsive to the indication of white smoke being emitted from the exhaust passage at the engine start event initiated at time t1, one or more glowplug(s) are activated (plot 640) at time t5, to provide an additional source of heat to the engine system. Furthermore, at time t5, the throttle is commanded to a closed position. In this example timeline 600, the throttle is commanded to the fully closed position, however it may be understood that in other examples, the throttle may be commanded to a substantially closed (e.g. within 95% closed) position. While not explicitly illustrated, it may be understood that, at time t5, if either the CPV or EGR valve are open, such valves may be commanded closed via the controller.

At time t6, the engine is controlled via the controller to be spun in reverse (plot 605), unfueled (plot 610). Engine speed is controlled to a predetermined speed (e.g. 500 RPM) while being spun in reverse unfueled. By spinning the engine in reverse unfueled, with the glowplug(s) activated, heat is directed to the intake manifold. More specifically, exhaust system heat may be routed to the intake manifold, due to the operating the engine unfueled in reverse. The engine may be spun in reverse via the motor (e.g. 120), using power provided via the onboard energy storage device (e.g. 150).

Accordingly, between time t6 and t7, intake manifold temperature rises (plot 620), while exhaust system temperature drops (plot 645), resulting from the transfer of exhaust system heat to the intake manifold. At time t7, intake manifold temperature reaches the threshold intake manifold temperature. With the intake manifold temperature having reached the threshold intake manifold temperature at time t7, the one or more glowplug(s) are deactivated (plot 640), and the engine is controlled to stop spinning in reverse. Specifically, the controller may send a signal to the one or more glowplug(s), actuating them off, and the controller may further send a signal to the motor, actuating it to stop rotation of the engine in reverse. Furthermore, the throttle is maintained closed. Maintaining the throttle closed may serve to trap heat in the intake manifold, until an engine start event is requested.

Between time t7 and t8, the engine remains off, as an engine start is not yet requested. Intake manifold temperature remains above the threshold intake manifold temperature. While not explicitly illustrated, it may be understood that, responsive to intake manifold temperature dropping below the threshold intake manifold temperature after routing exhaust heat to the intake manifold, additional exhaust heat may be routed to the intake manifold following the same methodology as discussed, provided that temperature of the exhaust system remains above the threshold exhaust system temperature.

At time t8, an engine start is requested. In other words, it may be understood that the vehicle operator has requested a wheel torque that exceeds a predetermined threshold, thus requiring an engine start event to provide the requested torque. Such a request may be communicated to the controller as a function of accelerator pedal position, for example.

Accordingly, fuel injection is provided to the engine (plot 610). In some examples, the glowplug(s) may be activated, but in other examples, the glowplug(s) may not be activated. In other words, because intake manifold temperature is above the threshold intake manifold temperature, additional heat may not result in improvements to fuel combustion during the engine start event, and thus battery power may be saved by not activating the glowplug(s) when intake manifold temperature is above the threshold. However, in other examples, glowplug(s) may still be activated, due to the low ambient temperature (plot 615), and due to the fact that intake manifold heating was utilized to improve fuel combustion at the next requested engine start event.

At time t8, the throttle is commanded to the default position, or the position the throttle was in just prior to commanding the throttle closed at time t5. With the intake manifold heating methodology conducted between time t4-t8, in some examples, onboard camera(s) may not be utilized to monitor exhaust color at the engine start event subsequent to conducting the intake manifold heating methodology. However, in other examples, the onboard cameras may be used to confirm that the intake manifold heating methodology resulted in the absence of white smoke at the next engine startup, depicted here at time t8. Accordingly, line 631 is represented as a dashed line, indicating that such an action of monitoring exhaust gas color at the engine start event may or may not be conducted.

Between time t8 and t9, engine speed rises in conjunction with the engine start event. At time t9, it may be understood that the engine start event is concluded, thus an engine start is no longer requested (plot 650). Between time t9 and t10, the engine is operated (plot 605) according to driver demand (plot 625). Furthermore, between time t9 and t10, while a S/S event is not indicated, intake manifold heating remains scheduled (plot 655). In other words, at any subsequent S/S event in the current drive cycle being initiated at time t1, it may be assessed as to whether conditions are met for conducting intake manifold heating, and if so, the methodology may be applied as discussed.

In this way, combustion may be improved at engine start events corresponding to S/S events in vehicles equipped with such technology. By improving combustion, undesired emissions stemming from incomplete combustion events may be reduced or eliminated. Furthermore, fuel economy may be improved, which is particularly desirable for hybrid vehicles equipped with S/S technology.

The technical effect is to recognize that, during or prior to S/S events, intake manifold temperatures may decrease (or fail to rise) to a point where poor combustion may result, and thus by spinning the engine in reverse, exhaust system heat may be effectively utilized to raise intake manifold temperatures to a threshold intake manifold temperature during S/S events. For vehicles equipped with S/S features, there may be many such stops along a particular drive cycle, where, if the above-described methodology were not utilized, many poor combustion engine start events may occur during such a drive cycle. Of course, such poor combustion engine start events may increase undesired emissions, reduce fuel economy, and may further reduce engine lifetime. Thus, mitigating such issues is highly desirable.

A further technical effect is to recognize that, while the engine is being spun in reverse, if the vehicle engine comprises a diesel engine, one or more glowplug(s) may be activated, to further increase an amount of heat delivered to the intake manifold. Energy provided to the glowplug(s) may be a function of SOC of an onboard energy storage device, and may additionally or alternatively be a function of exhaust system temperature and/or intake manifold temperature. Still further, a technical effect is to recognize that engine speed while being spun in reverse may be a function of exhaust system temperature and/or intake manifold temperature.

The systems described herein, and with reference to FIGS. 1-3B, along with the methods described herein, and with reference to FIGS. 4-5, may enable one or more systems and one or more methods. In one example, a method comprises spinning an engine of a vehicle in a reverse direction unfueled in response to an engine pull-down event until a temperature of an intake manifold of the engine rises to or above a threshold intake manifold temperature as a result of airflow from an exhaust manifold of the engine flowing through the engine and into the intake manifold. In a first example of the method, the method further includes wherein the reverse direction comprises a direction opposite that of a forward direction which the engine spins while combusting air and fuel to propel the vehicle. A second example of the method optionally includes the first example, and further comprises stopping spinning the engine in reverse in response to the temperature of the intake manifold rising to or above the threshold intake manifold temperature. A third example of the method optionally includes any one or more or each of the first and second examples, and further comprises controlling a throttle configured to control an amount of air inducted into the intake manifold, to a closed or substantially closed position, just prior to the spinning the engine in the reverse direction. A fourth example of the method optionally includes any one or more or each of the first through third examples, and further comprises maintaining the throttle closed or substantially closed subsequent to spinning the engine in the reverse direction, to trap heat in the intake manifold, until a request to start the engine is indicated. A fifth example of the method optionally includes any one or more or each of the first through fourth examples, and further comprises sealing the intake manifold from an exhaust gas recirculation system and an evaporative emissions system, just prior to spinning the engine in the reverse direction. A sixth example of the method optionally includes any one or more or each of the first through fifth examples, and further includes wherein the threshold intake manifold temperature results in a desired efficiency level of fuel combustion in response to a request to start the engine. A seventh example of the method optionally includes any one or more or each of the first through sixth examples, and further includes wherein the engine pull-down event comprises a start/stop event, where the start/stop event involves shut down of the engine to reduce an amount of time the engine spends idling. An eighth example of the method optionally includes any one or more or each of the first through eighth examples, and further includes wherein spinning the engine in the reverse direction in response to the engine pull-down event occurs in response to a scheduled intake manifold heating operation. A ninth example of the method optionally includes any one or more or each of the first through eighth examples, and further includes wherein scheduling the intake manifold heating operation involves monitoring a color of an exhaust gas exiting an exhaust system of the engine at an engine start event, the engine start event following an engine-off condition greater than a threshold engine-off duration, where ambient temperature is below a threshold ambient temperature; and scheduling the intake manifold heating operation in response to an indication that the color of the exhaust gas is white. A tenth example of the method optionally includes any one or more or each of the first through ninth examples, and further comprises stopping spinning the engine in the reverse direction in response to an exhaust system temperature dropping below a threshold exhaust system temperature during spinning the engine in the reverse direction.

Another example of a method comprises in response to a request to start an engine of a vehicle after the engine has been inactive for a predetermined duration, and further responsive to an ambient temperature below a threshold ambient temperature, monitoring a color of an exhaust gas exiting an exhaust system of the engine; and in response to the color of the exhaust being substantially white, scheduling an intake manifold heating operation to raise a temperature of an intake manifold of the engine to or above a threshold intake manifold temperature at a subsequent engine pull-down event during a drive cycle, the intake manifold heating operation involving rotating the engine unfueled in a reverse direction, and where the drive cycle is initiated at the request to start the engine after the engine has been inactive for the predetermined duration. In a first example of the method, the method further includes wherein rotating the engine in the reverse direction unfueled directs hot air in the exhaust system to the intake manifold until the temperature of the intake manifold rises to or above the threshold intake manifold temperature, and then stopping rotating the engine in the reverse direction; and wherein a speed that the engine is rotated in reverse is variable as a function of one or more of ambient temperature, intake manifold temperature, and/or exhaust system temperature. A second example of the method optionally includes the first example, and further includes wherein the intake manifold heating operation involves closing or substantially closing an air intake throttle positioned in an air intake passage of the engine, to trap heat in the intake manifold. A third example of the method optionally includes any one or more or each of the first and second examples, and further includes wherein monitoring the color of the exhaust gas is conducted at least in part via an onboard camera. A fourth example of the method optionally includes any one or more or each of the first through third examples, and further includes wherein the pull-down event includes a stop/start event involving shut down of the engine to reduce an amount of time the engine spends idling; and wherein scheduling the intake manifold heating operation includes scheduling the intake manifold heating operation for one or more start/stop events in the drive cycle, provided that the intake manifold temperature is below the threshold intake manifold temperature at the initiation of the start/stop events, or where the intake manifold temperature drops below the threshold intake manifold temperature during the stop/start events. A fifth example of the method optionally includes any one or more or each of the first through fourth examples, and further comprises aborting the intake manifold heating operation in response to a temperature of the exhaust system dropping below a threshold exhaust system temperature during the intake manifold heating operation.

An example of a system for a hybrid vehicle comprises an engine including an intake manifold and an exhaust system; a motor, configured to operate via energy supplied from an onboard energy storage device; a start/stop system; and a controller, storing instructions in non-transitory memory that, when executed, cause the controller to: schedule an intake manifold heating operation for an engine pull-down event corresponding to a start/stop event in response to an indication of poor combustion at an engine start event initiated after a predetermined duration that the engine has been inactive, where the engine start event initiated after the predetermined duration does not comprise the start/stop event; and conduct the intake manifold heating operation via rotating the engine in reverse unfueled via the motor, to direct hot air from the exhaust system to the intake manifold, in response to the engine pull-down event where the intake manifold heating operation is scheduled. In a first example of the system, the system further comprises an onboard camera; a vehicle exhaust smoke identification system; an ambient temperature sensor; and wherein the controller stores further instructions to indicate poor combustion at the engine start event in response to the onboard camera indicating that a color of an exhaust gas exiting the exhaust system during the engine start event is white, and further responsive to an indication that an ambient temperature is below a threshold ambient temperature. A second example of the system optionally includes the first example, and further comprises an intake manifold temperature sensor; an exhaust system temperature sensor; a throttle; and wherein the controller stores further instructions to conduct the intake manifold heating operation in response to an intake manifold temperature, as monitored via the intake manifold temperature sensor, below a threshold intake manifold temperature at the time of the engine pull-down event or during a time period that the engine is pulled-down prior to being restarted; and wherein conducting the intake manifold heating operation further includes controlling the throttle to a substantially closed position for conducting the intake manifold heating operation, and aborting the intake manifold heating operation if an exhaust system temperature falls below a threshold exhaust system temperature, during the conducting the intake manifold heating operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
spinning an engine of a vehicle in a reverse direction unfueled in response to an engine pull-down event until a temperature of an intake manifold of the engine rises to or above a threshold intake manifold temperature as a result of airflow from an exhaust manifold of the engine flowing through the engine and into the intake manifold.

2. The method of claim 1, wherein the reverse direction comprises a direction opposite that of a forward direction which the engine spins while combusting air and fuel to propel the vehicle.

3. The method of claim 1, further comprising stopping spinning the engine in reverse in response to the temperature of the intake manifold rising to or above the threshold intake manifold temperature.

4. The method of claim 1, further comprising controlling a throttle configured to control an amount of air inducted into the intake manifold, to a closed or substantially closed position, just prior to the spinning the engine in the reverse direction.

5. The method of claim 4, further comprising maintaining the throttle closed or substantially closed subsequent to spinning the engine in the reverse direction, to trap heat in the intake manifold, until a request to start the engine is indicated.

6. The method of claim 1, further comprising sealing the intake manifold from an exhaust gas recirculation system and an evaporative emissions system, just prior to spinning the engine in the reverse direction.

7. The method of claim 1, wherein the threshold intake manifold temperature results in a desired efficiency level of fuel combustion in response to a request to start the engine.

8. The method of claim 1, wherein the engine pull-down event comprises a start/stop event, where the start/stop event involves shut down of the engine to reduce an amount of time the engine spends idling.

9. The method of claim 1, wherein spinning the engine in the reverse direction in response to the engine pull-down event occurs in response to a scheduled intake manifold heating operation.

10. The method of claim 9, wherein scheduling the intake manifold heating operation involves monitoring a color of an exhaust gas exiting an exhaust system of the engine at an engine start event, the engine start event following an engine-off condition greater than a threshold engine-off duration, where ambient temperature is below a threshold ambient temperature; and
scheduling the intake manifold heating operation in response to an indication that the color of the exhaust gas is white.

11. The method of claim 10, further comprising stopping spinning the engine in the reverse direction in response to an exhaust system temperature dropping below a threshold exhaust system temperature during spinning the engine in the reverse direction.

12. A method comprising:
in response to a request to start an engine of a vehicle after the engine has been inactive for a predetermined duration, and further responsive to an ambient temperature below a threshold ambient temperature, monitoring a color of an exhaust gas exiting an exhaust system of the engine; and
in response to the color of the exhaust being substantially white, scheduling an intake manifold heating operation to raise a temperature of an intake manifold of the engine to or above a threshold intake manifold temperature at a subsequent engine pull-down event during a drive cycle, the intake manifold heating operation involving rotating the engine unfueled in a reverse direction, and where the drive cycle is initiated at the request to start the engine after the engine has been inactive for the predetermined duration.

13. The method of claim 12, wherein rotating the engine in the reverse direction unfueled directs hot air in the exhaust system to the intake manifold until the temperature of the intake manifold rises to or above the threshold intake manifold temperature, and then stopping rotating the engine in the reverse direction; and
wherein a speed that the engine is rotated in reverse is variable as a function of one or more of ambient temperature, intake manifold temperature, and/or exhaust system temperature.

14. The method of claim 12, wherein the intake manifold heating operation involves closing or substantially closing an air intake throttle positioned in an air intake passage of the engine, to trap heat in the intake manifold.

15. The method of claim 12, wherein monitoring the color of the exhaust gas is conducted at least in part via an onboard camera.

16. The method of claim 12, wherein the pull-down event includes a stop/start event involving shut down of the engine to reduce an amount of time the engine spends idling; and
wherein scheduling the intake manifold heating operation includes scheduling the intake manifold heating operation for one or more start/stop events in the drive cycle, provided that the intake manifold temperature is below the threshold intake manifold temperature at the initiation of the start/stop events, or where the intake manifold temperature drops below the threshold intake manifold temperature during the stop/start events.

17. The method of claim 12, further comprising aborting the intake manifold heating operation in response to a temperature of the exhaust system dropping below a threshold exhaust system temperature during the intake manifold heating operation.

18. A system for a hybrid vehicle, comprising:
an engine including an intake manifold and an exhaust system;
a motor, configured to operate via energy supplied from an onboard energy storage device;
a start/stop system; and
a controller, storing instructions in non-transitory memory that, when executed, cause the controller to:
schedule an intake manifold heating operation for an engine pull-down event corresponding to a start/stop event in response to an indication of poor combustion at an engine start event initiated after a predetermined duration that the engine has been inactive, where the engine start event initiated after the predetermined duration does not comprise the start/stop event; and
conduct the intake manifold heating operation via rotating the engine in reverse unfueled via the motor, to direct hot air from the exhaust system to the intake manifold, in response to the engine pull-down event where the intake manifold heating operation is scheduled.

19. The system of claim 18, further comprising:
an onboard camera;
a vehicle exhaust smoke identification system;
an ambient temperature sensor; and
wherein the controller stores further instructions to indicate poor combustion at the engine start event in response to the onboard camera indicating that a color of an exhaust gas exiting the exhaust system during the engine start event is white, and further responsive to an indication that an ambient temperature is below a threshold ambient temperature.

20. The system of claim 18, further comprising:
an intake manifold temperature sensor;
an exhaust system temperature sensor;
a throttle; and
wherein the controller stores further instructions to conduct the intake manifold heating operation in response to an intake manifold temperature, as monitored via the intake manifold temperature sensor, below a threshold intake manifold temperature at the time of the engine pull-down event or during a time period that the engine is pulled-down prior to being restarted; and
wherein conducting the intake manifold heating operation further includes controlling the throttle to a substantially closed position for conducting the intake manifold heating operation, and aborting the intake manifold heating operation if an exhaust system temperature falls below a threshold exhaust system temperature, during the conducting the intake manifold heating operation.

* * * * *